| United States Patent [19]
Fischer | [11] 3,862,832
[45] Jan. 28, 1975 |

[54] HERBICIDAL MIXTURES OF THIOALKYL CARBAMATES AND 1-PHENYL-4-AMINO-5-HALOPYRIDAZONE-(6) OR SALTS THEREOF

[76] Inventor: Adolf Fischer, 43 Speyerer Strasse, 6704 Mutterstadt, Germany

[22] Filed: Oct. 9, 1973

[21] Appl. No.: 404,284

Related U.S. Application Data

[63] Continuation-in-part of Ser. No. 82,514, Oct. 20, 1970, abandoned.

[30] Foreign Application Priority Data

Oct. 23, 1969 Germany............................ 1953261

[52] U.S. Cl........................................ 71/92, 71/100
[51] Int. Cl.............................................. A01n 9/22
[58] Field of Search............................... 71/92, 100

[56] References Cited
UNITED STATES PATENTS

| 3,133,947 | 5/1964 | Tilles ................................. 260/455 |
| 3,210,353 | 10/1965 | Reicheneder et al............... 260/250 |
| 3,687,997 | 8/1972 | Kiehs et al....................... 260/455 A |
| 3,742,007 | 6/1973 | Osieka et al.................... 260/455 A |

OTHER PUBLICATIONS

Young et al. Chem. Abst. 130001W, Vol. 73 (1970)

*Primary Examiner*—Lewis Gotts
*Assistant Examiner*—Catherine L. Mills
*Attorney, Agent, or Firm*—Johnston, Keil, Thompson & Shurtleff

[57] ABSTRACT

Herbicidal mixtures consisting essentially of herbicidal mixtures of thioalkyl carbamates and 1-phenyl-4-amino-5-halopyridazone-(6) or salts thereof in a weight ratio of 5:1 to 1:3, and process for controlling growth of undesired plants with said mixtures.

12 Claims, No Drawings

HERBICIDAL MIXTURE OF THIOALKYL CARBAMATES AND 1-PHENYL-4-AMINO-5-HALOPYRIDAZONE-(6) OR SALTS THEREOF

RELATED APPLICATION

This application is a continuation-in-part of my copending application Ser. No. 82,514, filed Oct. 20, 1970 now abandoned.

The present invention relates to new herbicides, particularly selective herbicides, which are suitable for controlling unwanted plants without damaging crop plants.

It is known to use pyridazone and quinazoline derivatives and thiolcarbamates as herbicidal active ingredients; however, their action is not always satisfactory.

We have now found that herbicides comprising a mixture of a. a compound of the formula

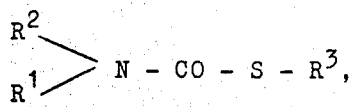

where $R^1$ denotes lower alkyl, propargyl, cyanomethyl, β-cyanomethyl or β-chloro-β-cyanoethyl, $R^2$ denotes phenyl, cyclohexyl or an aliphatic radical having not more than 6 carbon atoms (methyl, ethyl, propyl, isopropyl, butyl, isobutyl, sec-butyl, tert-butyl, n-hexyl, n-pentyl, allyl, methallyl, isobutynyl, 3-methylbutyn-(1)-yl-(3)) which may be substituted by hydroxy, chloro, thiocyano, lower alkoxy (methoxy, ethoxy, propoxy) or alkylthioether (methyl, ethyl, propyl, isopropyl, butyl, isobutyl), $R^2$ further denotes a bicycloaliphatic, tricycloaliphatic or tetracycloaliphatic radical having a total of 7 to 12 carbon atoms, e.g., bicyclo-(2,2,1)-heptyl, methylbicyclo-(2,2,1)-heptyl, bicyclo-(3,3,0)-octyl, bicyclo-(2,2,2)-octyl, bicyclo-(3,2,1)-octyl, bicyclo-(5,2,1,0$^{2,6}$)-decyl, tricyclo-(6,2,1,0$^{2,7}$)-undecyl, tetracyclo-(6,2,1,1$^{3,6}$, 0$^{2,7}$)-dodecyl, and $R^3$ denotes an aliphatic hydrocarbon radical, e.g., methyl, ethyl, propyl, isopropyl, butyl, isobutyl, sec-butyl, tert-butyl, allyl, methallyl, isobutynyl, 3-methylbutyn-(1)-yl-(3), which may be substituted by one or more than one halogen atom (chlorine, bromine), e.g., dichloroalkyl, trichloroalkyl or dichloromethallyl and b. a compound of the formula

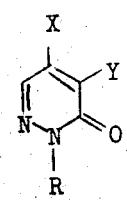

where R denotes phenyl which may be substituted by methyl or trifluoromethyl or R denotes cyclohexyl, X denotes amino, acetylamino, methoxy or a NH—CO—COOR$^1$ group, R$^1$ denoting hydrogen, methyl, ethyl, phenyl, or an alkali metal (sodium potassium) or amine salt (dimethyl, ethanolamine, diethylenetriamine, ethanolethylenediamine, trimethanolmethylamine, diethylethanolamine) of the acid, and Y denotes chlorine, bromine, iodine, methyl or methoxy, have a superior herbicidal action to that of the active ingredients used individually.

The active ingredients may be mixed in any desired weight ratio. Mixtures of a:b of from 5:1 to 1:3 are preferred.

The herbicidal mixtures according to the invention may be used as solutions, emulsions, suspensions or dusts. The form of application to the loci of the plants depends entirely on the purpose for which the agents are being used; in any case it should ensure a fine distribution of the active ingredient.

For the preparation of solutions to be sprayed direct, water, mineral oil fractions having a medium to high boiling points, such as kerosene and diesel oil, coal tar oils, oils of vegetable or animal origin, and cyclic hydrocarbons, such as tetrahydronaphthalene and alkylated naphthalenes are suitable.

Aqueous formulations may be prepared from emulsion concentrates, pastes or wettable powders by adding water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent.

Dusts may be prepared by mixing or grinding the active ingredients with a solid carrier.

The mixtures may be used per se or in admixture with insecticides, fungicides, and fertilizers.

The following examples illustrate the use of the agents according to the invention.

EXAMPLE 1

In a greenhouse, loamy clayey soil is filled into pots and sown with *Beta vulgaris*, *Zea mays*, *Echinochloa crus-galli*, *Poa annua*, *Sinapis arvensis* and *Matricaria chamomilla*. The soil prepared in this manner is then treated with the following amounts of each of the following active ingredients and mixture of them, each amount being dispersed in 500 liters of water per hectare:

I thioethyl N-cyclohexyl-N-propargylcarbamate, b.p. (0.01 cm): 117° to 119° C, 3 kg per hectare;

II dimethylethanolamine salt of N-[1-phenyl-5-bromopyridazon-(6)-yl-(4)]-oxamic acid, 3 kg per hectare;

III I + II, 3 kg per hectare + 3 kg per hectare.

After 4 to 5 weeks it is ascertained that mixture III has a better action than the individual active ingredients on the unwanted plants, combined with the same good crop plant compatibility.

The results of the experiment are given in the following table:

|  | Active ingredient I | II | Mixture III |
|---|---|---|---|
| Crop plants: | | | |
| Beta vulgaris | 0 | 0 | 0 |
| Zea mays | 0 | 0 | 0 |
| Unwanted plants: | | | |
| Echinochloa crus-galli | 90 | 70 | 95 |
| Poa annua | 90 | 40 | 95 |
| Sinapis arvensis | 30 | 80 | 90 |
| Matricaria chamomilla | 10 | 100 | 100 |

0 = no damage    100 = complete destruction

EXAMPLE 2

In a greenhouse, loamy sandy soil is filled into pots and sown with *Beta vulgaris*, *Zea mays*, *Poa annua*, *Si-*

*napis arvensis* and *Matricaria chamomilla*. The soil prepared in this manner is then treated the following amounts of each of the following active ingredients and mixture of them, each amount being dispersed in 500 liters of water per hectare:

I thioethyl N-cyclohexyl-N-propargylcarbamate, 3 kg per hectare;
II 1-phenyl-4-amino-5-chloropyridazone-6, 3 kg per hectare;
III I + II, 3 kg per hectare + 3 kg per hectare.

After 4 to 5 weeks it is ascertained that mixture III has a better action than the individual active ingredients on the unwanted plants, combined with the same good crop plant compatibility.

The results of the experiment are given in the following table:

|  | Active ingredient I | II | Mixture III |
|---|---|---|---|
| Crop plants: | | | |
| Beta vulgaris | 0 | 0 | 0 |
| Zea mays | 0 | 0 | 0 |
| Unwanted plants: | | | |
| Echinochloa crus-galli | 90 | 30 | 90 |
| Poa annua | 90 | 70 | 95 |
| Sinapis arvensis | 30 | 80 | 90 |
| Matricaria chamomilla | 10 | 100 | 100 |

0 = no damage    100 = complete destruction

EXAMPLE 3

In a greenhouse, loamy clayey soil is filled into pots and sown with *Beta vulgaris*, *Zea mays*, *Echinochloa crus-galli*, *Poa annua*, *Sinapis arvensis* and *Matricaria chamomilla*. The soil prepared in this manner is then treated with the following amounts of the following active ingredients and mixture of them, each amount being dispersed in 500 liters of water per hectare:

I thioethyl N-cyclohexyl-N-propargylcarbamate, 3 kg per hectare;
II sodium salt of N-[1-phenyl-5-bromopyridazon-(6)-yl-(4)]-oxamic acid, 3 kg per hectare;
III I + II, 3 kg per hectare + 3 kg per hectare.

After 4 to 5 weeks it is ascertained that mixture III has a better action than the individual active ingredients on the unwanted plants, combined with the same good crop plant compatibility.

The results of the experiment are given in the following table:

|  | Active ingredient I | II | Mixture III |
|---|---|---|---|
| Crop plants: | | | |
| Beta vulgaris | 0 | 0 | 0 |
| Zea mays | 0 | 0 | 0 |
| Unwanted plants: | | | |
| Echinchloa crus-galli | 90 | 60 | 95 |
| Poa annua | 90 | 40 | 95 |
| Sinapis arvensis | 30 | 70 | 90 |
| Matricaria chamomilla | 10 | 100 | 100 |

0 = no damage    100 = complete destruction

EXAMPLE 4

An agricultural plot was sown with the seeds of the plants listed below. The soil prepared in this manner was then immediately treated with the following amounts of the following individual active ingredients and mixtures thereof:

I  1-phenyl-4-amino-5-chloropyridazone-(6), 0.25, 0.5, 0.75, 1.0, 3.0, 4.0 and 6.0 kg/hectare;
II ethyl N-ethyl-N-cyclohexylthiolcarbamate, 0.25, 0.5, 0.75, 1.0, 3.0, 4.0, 5.0 and 6.0 kg/hectare;
III methyl-N-ethyl-N-bicyclo-[3,3,0]-octylthiolcarbamate, 0.25, 0.5, 0.75, 1.0, 3.0, 4.0, 5.0 and 6.0 kg/hectare;
IV ethyl-N-ethyl-N-bicyclo-[3,3,0]-octylthiolcarbamate, 0.25, 0.5, 0.75, 1.0, 5.0 and 6.0 kg/hectare;
V N-[4-(4'-chlorophenoxy)-phenyl]-N',N'-dimethylurea, 1.0, 3.0 and 4.0 kg/hectare;
I + II: 0.25 + 0.75; 0.25 + 0.25; 0.75 + 0.25; 1.0 + 5.0; 1.0 + 3.0; and 3.0 + 1.0 kg/hectare;
I + III: 0.25 + 0.75; 0.25 + 0.25; 0.75 + 0.25; and 1.0 + 5.0 kg/hectare.
I + IV: 0.25 + 0.75; 0.25 + 0.25; 0.75 + 0.25; and 1.0 + 5.0 kg/hectare;
V + III: 3.0 + 1.0 kg/hectare.

After 3 to 4 weeks it was ascertained that the mixtures I + II, I + III and I + IV had a better herbicidal action than the individual components I, II, III, IV, V and the mixture V + III, combined with the same good crop plant compatibility.

The results of the experiment are given below:

| Active ingredient kg/ha | I | | | | | | |
|---|---|---|---|---|---|---|---|
|  | 0.25 | 0.5 | 0.75 | 1.0 | 3.0 | 4.0 | 6.0 |
| Crop plants: | | | | | | | |
| Beta vulgaris | 0 | 0 | 0 | 0 | 0 | 10 | 20 |
| Zea mays | 0 | 0 | 0 | 0 | 0 | 22 | 30 |
| Unwanted plants: | | | | | | | |
| Avena fatua | 2 | 5 | 7 | 10 | 40 | 70 | 100 |
| Echinochloa crus-galli | 3 | 6 | 7 | 10 | 30 | 60 | 80 |
| Poa annua | 5 | 10 | 15 | 20 | 65 | 85 | 100 |
| Sinapis arvensis | 8 | 15 | 22 | 35 | 80 | 100 | 100 |
| Matricaria chamomilla | 10 | 20 | 30 | 40 | 100 | 100 | 100 |

| Active ingredient kg/ha | II | | | | | | | |
|---|---|---|---|---|---|---|---|---|
|  | 0.25 | 0.5 | 0.75 | 1.0 | 3.0 | 4.0 | 5.0 | 6.0 |
| Crop plants: | | | | | | | | |
| Beta vulgaris | 0 | 0 | 0 | 0 | 0 | 3 | 5 | 10 |
| Zea Mays | 0 | 0 | 0 | 0 | 0 | 10 | 15 | 20 |
| Unwanted plants: | | | | | | | | |
| Avena fatua | 10 | 18 | 30 | 40 | 100 | 100 | 100 | 100 |
| Echinochloa crus-galli | 8 | 14 | 26 | 40 | 100 | 100 | 100 | 100 |
| Poa annua | 12 | 20 | 30 | 42 | 100 | 100 | 100 | 100 |
| Sinapis arvensis | 3 | 8 | 8 | 10 | 40 | 50 | 60 | 70 |
| Matricaria chamomilla | 7 | 11 | 16 | 20 | 55 | 65 | 70 | 80 |

| Active ingredient kg/ha | 0.25 | 0.5 | 0.75 | III 1.0 | 3.0 | 4.0 | 5.0 | 6.0 |
|---|---|---|---|---|---|---|---|---|
| Crop plants: | | | | | | | | |
| Beta vulgaris | 0 | 0 | 0 | 0 | 5 | 5 | 5 | 8 |
| Zea mays | 0 | 0 | 0 | 0 | 10 | 10 | 10 | 12 |
| Unwanted plants: | | | | | | | | |
| Avena fatua | 10 | 25 | 31 | 40 | 100 | 100 | 100 | 100 |
| Echinochloa crus-galli | 10 | 18 | 30 | 40 | 100 | 100 | 100 | 100 |
| Poa annua | 15 | 25 | 35 | 50 | 100 | 100 | 100 | 100 |
| Sinapis arvensis | 3 | 5 | 8 | 10 | 40 | 50 | 65 | 75 |
| Matricaria chamomilla | 3 | 6 | 8 | 11 | 45 | 45 | 46 | 55 |

| Active ingredient kg/ha | 0.25 | 0.5 | 0.75 | IV 1.0 | 5.0 | 6.0 |
|---|---|---|---|---|---|---|
| Crop plants: | | | | | | |
| Beta vulgaris | 0 | 0 | 0 | 0 | 4 | 6 |
| Zea mays | 0 | 0 | 0 | 0 | 8 | 10 |
| Unwanted plants: | | | | | | |
| Avena fatua | 15 | 30 | 40 | 50 | 100 | 100 |
| Echinochloa crus-galli | 11 | 23 | 35 | 45 | 100 | 100 |
| Poa annua | 15 | 25 | 35 | 50 | 100 | 100 |
| Sinapis arvensis | 2 | 5 | 7 | 9 | 50 | 60 |
| Matricaria chamomilla | 3 | 6 | 8 | 10 | 45 | 55 |

| Active ingredient kg/ha | V 1.0 | 3.0 | 4.0 |
|---|---|---|---|
| Crop plants: | | | |
| Beta vulgaris | 20 | 60 | 70 |
| Zea mays | 10 | 30 | 50 |
| Unwanted plants: | | | |
| Avena fatua | 10 | 30 | 40 |
| Echinochloa crus-galli | 20 | 50 | 60 |
| Poa annua | 20 | 60 | 70 |
| Sinapis arvensis | 20 | 60 | 73 |
| Matricaria chamomilla | 15 | 50 | 60 |

| Active ingredient kg/ha | 0.25 + 0.75 | I + II 0.25 + 0.25 | 0.75 + 0.25 |
|---|---|---|---|
| Crop plants: | | | |
| Beta vulgaris | 0 | 0 | 0 |
| Zea mays | 0 | 0 | 0 |
| Unwanted plants: | | | |
| Avena fatua | 45 | 25 | 43 |
| Echinochloa crus-galli | 50 | 31 | 36 |
| Poa annua | 58 | 35 | 45 |
| Sinapis arvensis | 37 | 36 | 51 |
| Matricaria chamomilla | 45 | 40 | 60 |

| Active ingredient kg/ha | 1.0 + 5.0 | I + II 1.0 + 3.0 | 3.0 + 1.0 |
|---|---|---|---|
| Crop plants: | | | |
| Beta vulgaris | 5 | 0 | 0 |
| Zea mays | 15 | 0 | 0 |
| Unwanted plants: | | | |
| Avena fatua | 100 | 100 | 100 |
| Echinochloa crus-galli | 100 | 100 | 85 |
| Poa annua | 100 | 100 | 100 |
| Sinapis arvensis | 100 | 95 | 100 |
| Matricaria chamomilla | 100 | 100 | 100 |

| Active ingredient kg/ha | 0.25 + 0.75 | 0.25 + 0.25 | I + III 0.75 + 0.25 | 1.0 + 5.0 |
|---|---|---|---|---|
| Crop plants: | | | | |
| Beta vulgaris | 0 | 0 | 0 | 5 |
| Zea mays | 0 | 0 | 0 | 10 |
| Unwanted plants: | | | | |
| Avena fatua | 55 | 28 | 37 | 100 |
| Echinochloa crus-galli | 60 | 35 | 40 | 100 |
| Poa annua | 60 | 40 | 55 | 100 |
| Sinapis arvensis | 40 | 24 | 45 | 100 |
| Matricaria chamomilla | 35 | 36 | 50 | 95 |

| Active ingredient kg/ha | 0.25 + 0.75 | 0.25 + 0.25 | I + IV 0.75 + 0.25 | 1.0 + 5.0 |
|---|---|---|---|---|
| Crop plants: | | | | |
| Beta vulgaris | 0 | 0 | 0 | 4 |
| Zea mays | 0 | 0 | 0 | 8 |
| Unwanted plants: | | | | |
| Avena fatua | 60 | 40 | 53 | 100 |
| Echinochloa crus-galli | 70 | 30 | 50 | 100 |
| Poa annua | 60 | 30 | 55 | 100 |
| Sinapis arvensis | 40 | 34 | 40 | 95 |
| Matricaria chamomilla | 45 | 35 | 50 | 100 |

| Active ingredient | V + III |
| kg/ha | 3.0 + 1.0 |
| --- | --- |
| Crop plants: | |
| Beta vulgaris | 60 |
| Zea mays | 30 |
| Unwanted plants: | |
| Avena fatua | 100 |
| Echinochloa crus-galli | 100 |
| Poa annua | 100 |
| Sinapis arvensis | 90 |
| Matricaria chamomilla | 80 |

0 = no damage
100 = complete destruction.

These results show that the new mixtures I + II, I + III and I + IV have a herbicidal action far superior to that of their individual components. The mixture of V + III damages the crop plants so badly that this mixture cannot be used agriculturally.

Active ingredient V is a known urea herbicide included in the foregoing example for purposes of comparison of its effect individually and in mixtures with the herbicidal mixtures of the subject invention.

I claim:

1. A selective herbicide composition containing a herbicidally effective amount of a mixture consisting essentially of a. a compound of the formula

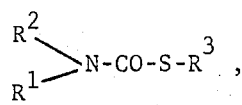

where R¹ denotes lower alkyl or propargyl, R² denotes cyclohexyl or bicyclooctyl, and R³ denotes alkyl of 1-4 carbon atoms and b. a compound of the formula

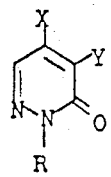

where R denotes phenyl which may be substituted by methyl, X denotes amino and Y denotes chlorine, bromine or iodine, the weight ratio of a to b being in the range of 5:1 to 1:3.

2. A herbicide as claimed in claim 1 wherein R¹ denotes propargyl and R² denotes cyclohexyl.

3. A herbicide as claimed in claim 1 wherein R¹ denotes lower alkyl and R² denotes bicyclo-[3,3,0]-octyl.

4. A herbicide as claimed in claim 1 wherein R¹ denotes lower alkyl and R² denotes cyclohexyl.

5. A herbicide as claimed in claim 4 wherein R denotes phenyl and Y denotes chlorine.

6. A herbicide as claimed in claim 3 wherein R denotes phenyl and Y denotes chlorine.

7. A process for controlling the growth of unwanted plants in crop plants wherein the loci in which the growth of the unwanted plants is to be prevented is treated with a herbicidally effective amount of a herbicidal mixture consisting essentially of a. a compound of the formula

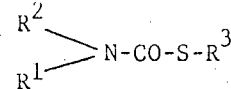

where R¹ denotes lower alkyl or propargyl, R² denotes cyclohexyl or bicyclooctyl, and R³ denotes alkyl of 1-4 carbon atoms and b. a compound of formula

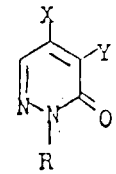

where R denotes phenyl which may be substituted by methyl, X denotes amino and Y denotes chlorine, bromine or iodine, the weight ratio of a to b being in the range of 5:1 to 1:3.

8. A process as claimed in claim 7 wherein R¹ denotes propargyl and R² denotes cyclohexyl.

9. A process as claimed in claim 7 wherein R¹ denotes lower alkyl and R² denotes bicyclo-[3,3,0]-octyl.

10. A process as claimed in claim 7 wherein R¹ denotes lower alkyl and R² denotes cyclohexyl.

11. A process as claimed in claim 10 wherein the weight ratio of a to b is in the range of 3:1 to 1:3.

12. A process as claimed in claim 9 wherein the weight ratio of a to b is in the range of 3:1 to 1:3.

* * * * *